United States Patent Office 2,806,565
Patented Sept. 17, 1957

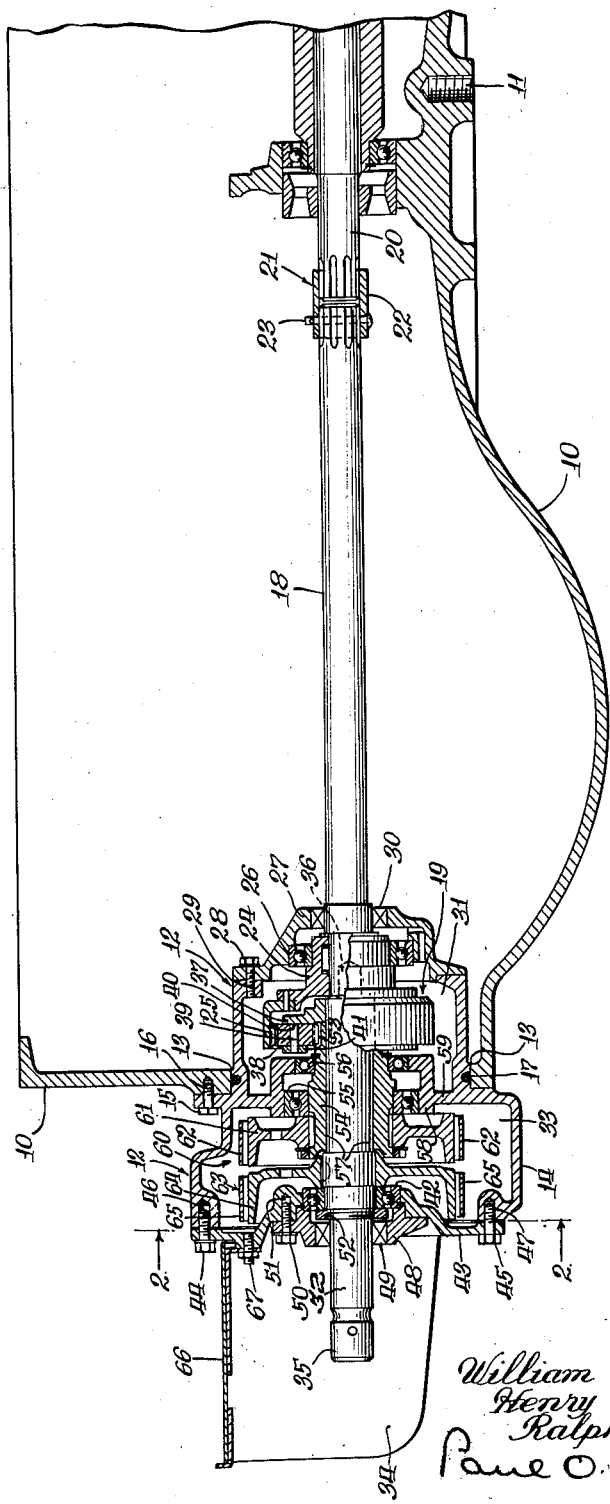

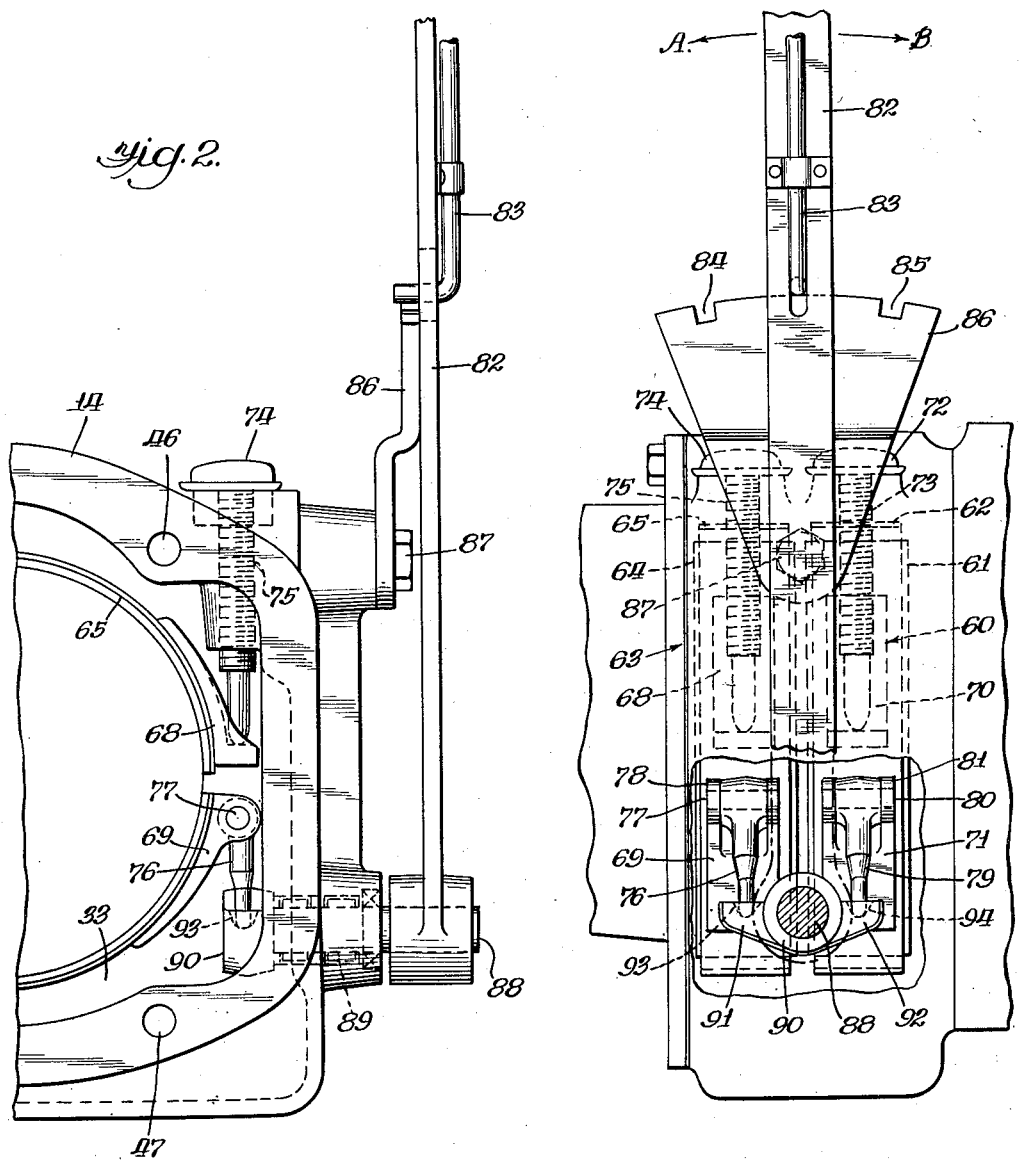

2,806,565

POWER-TAKE-OFF MECHANISM FOR TRACTORS

William C. Rosenthal, Chicago, Henry A. Ferguson, Lombard, and Ralph C. Boyle, Chicago, Ill., assignors to International Harvester Company, a corporation of New Jersey Application June 4, 1954, Serial No. 434,455

2 Claims. (Cl. 192—4)

This invention relates to an auxiliary power take-off mechanism for a vehicle such as a tractor and more particularly concerns a detachable power take-off unit incorporating a speed-reduction gearing unit in combination with a braking means for selectively driving the mechanism at reduced speed or preventing rotation of the driven shaft.

Farm tractors usually have a power take-off shaft through which power is transmitted from the vehicle engine for driving movable parts of an implement, such as a harvesting machine or the like, while the implement is being towed or otherwise propelled by the tractor. Now in some of these power take-off installations the source of power for the power take-off shaft is derived from the vehicle engine at a position in the traction-wheel-driving power train ahead of the main friction clutch which is interposed in such train ahead of a conventional change-speed transmission gearing unit. In this type of installation the power take-off shaft can be driven continuously from the engine during disengagement and reengagement of the main clutch attendant to the shifting of speeds in the conventional transmission unit. Thus the power take-off mechanism is continuously driven by the engine independently of the driving connection between the engine and the traction wheels.

A continuous power take-off mechanism as described above has a distinct disadvantage in that the mechanism operates at all times when the tractor's engine is running. Now if the power take-off drive is driven from a point between the main clutch and the conventional transmission unit then the disadvantage is that the operation of the power take-off mechanism must necessarily be interrupted at any time the conventional transmission unit is shifted from one speed connection to another.

To offset the above mentioned disadvantages it has been proposed to place a friction clutch in the power take-off power train whereby a load, such as the moving parts of an implement connected to the tractor, can be selectively disengaged or started from rest by the disconnection or connection of the friction clutch irrespective of whether the drive through the conventional transmission unit to the propelling means is in operation. This type of an arrangement is what is known as an independent power take-off mechanism.

Now in some types of implements having movable parts driven by the tractor's power take-off mechanism it is desirable to have the power take-off operate at a reduced speed providing increased torque to the implement. Furthermore it is desirable from the viewpoint of safety to the operator and the possible damage to the implement to prevent rotation of the power take-off shaft when either not in use, such as during transport or when connecting or disconnecting the implement to the tractor.

The present invention contemplates and has as an object thereof the provision of a reduced speed planetary gearing power transmission unit drivingly connected at a point between the tractor's engine and the tractive propelling units thereof that can be engaged under load at a reduced speed.

A further object is the provision of a power take-off mechanism according to the preceding object whereby a brake is provided to prevent rotation of the driven shaft of the mechanism when the planetary gearing power transmission unit is disengaged thereby permitting the drive shaft of the mechanism to continue rotation.

Another object is the provision of a power take-off mechanism in accordance with the preceding objects whereby the mechanism is auxiliary in that it is detachable for replacement by a conventional power take-off unit.

A still further object is to provide a power take-off mechanism in accordance with the preceding objects whereby the control of the mechanism is adapted for operation by the tractor operator from the operator's station.

The above and other desirable objects inherent in and encompassed by the invention are further evident in the ensuing description, the appended claims, and the annexed drawings, wherein:

Figure 1 is a side elevational view, partly in section, taken through the longitudinal axis of the power take-off mechanism mounted in the rearward portion of a tractor.

Figure 2 is an end elevational view taken along the line 2—2 of Figure 1 broken to illustrate details of the braking mechanism and omitting the rotatable parts and the bearings therefor.

Figure 3 is a side elevational view partly in section to illustrate the means for controlling the operation of the braking means.

Referring to Figure 1 casing or tractor frame 10 encloses the usual conventional change-speed tractive transmission and final drive system (not shown) for providing power to the traction wheels of a tractor. The power take-off mechanism generally indicated at 12 is mounted in the opening 13 of the casing 10. The compartmented housing 14 for the power take-off mechanism is secured rigidly to the casing 10 by suitably disposed bolts one of which is shown at 15. The bolts 15 are secured to the casing 10 by the recessed portions 16 threaded to fit the bolts 15. A circumferentially disposed sealing ring 17 is interposed at the juncture of casing 10 and housing 14 to prevent the leakage of lubricant from the casing 10 therethrough.

The power take-off drive shaft 18 is drivingly connected to the power train shaft 20 by means of a splined connection generally indicated at 21. The power train shaft 20 and the drive shaft 18 are splined at the ends thereof to slidably receive a splined sleeve 22. The sleeve 22 is secured to the drive shaft 18 by pin 23 to prevent it from dropping into casing 10 when the power take-off mechanism 12 is withdrawn from the casing 10 for removal or servicing thereof.

A planetary gearing unit generally indicated at 19 is mounted within a compartment 31 of the housing 14. A planetary ring gear 24 having circumferentially disposed gear teeth 25 is carried by a bearing race 26 secured to a cap 27. The cap 27 is secured to the housing 14 by suitably disposed bolts one of which is shown at 28. The bolts 28 are fitted for reception into threaded recesses 29 in housing 14. The complementary portion of the ring gear 24 is constrained for rotation with the drive shaft 18. A circumferentially disposed sealing ring 30 is fitted into the cap 27 to prevent the leakage of lubricant from casing 10 into compartment 31 of the housing 14.

A driven shaft 32 extends coaxially with drive shaft 18 from the compartment 31 through a brake chamber 33 to the outside at 34. The outer portion 35 of the driven shaft 32 is adapted for a driving connection to an implement (not shown). The inner portion of the driven shaft 32 is of reduced diameter and piloted to fit rotatably within the recessed portion 36 of the drive shaft 18 so that the driven shaft 32 is rotatable in axial alignment with the drive shaft 18.

A planetary carrier 37 is connected to and constrained for rotation with the driven shaft 32. A plurality of pinion gears equilaterally disposed about the carrier 37, one of which is shown at 38, are constrained for rotation about their respective pinion shafts, one of which is illustrated at 39. The pinion shaft 39 is mounted on the carrier 37 at 40. The collar portion 41 is part of the carrier 37 and is connected to the pinion shaft 39 to prevent axial movement of the pinion gear 38.

The driven shaft 32 near the outer end is supported rotatably by bearing race 42. Bearing 42 in turn is supported by an end bell 43. Bell 43 is rigidly connected to the housing 14 by suitably disposed bolts two of which are shown at 44 and 45, adapted for reception into corresponding threaded cavities, two of which are shown at 56 and 47. A retaining cover 48, having a sealing ring 49 disposed circumferentially about the driven shaft 32, is rigidly mounted on the end bell 43 to position and retain the bearing 42. The retaining cover is rigidly mounted on the end bell 43 by suitably disposed bolts one of which is shown at 50, the bolts 50 being adapted to fit into corresponding threaded cavities 51 in the end bell 43. A hub 52 is interposed adjacent to the bearing 42 for retaining the bearing.

A sun gear or force-reaction member 53 having a complementary sleeve-like portion or tubular shaft 54 is supported by bearing races 55 and 56 so that the sun gear 53 and sleeve 54 are constrained for rotation concentrically about the driven shaft 32 and in axial alinement therewith. It should be noted that a clearance 57 is interposed between the sun gear 53 including tubular shaft 54 and the driven shaft 32 to prevent binding therebetween. The bearings 55 and 56 are supported radially and axially in an annularly flanged portion 58 of a partition wall 59 of the housing 14, the wall 59, serving, in addition thereto, as a means of separating compartment 31 from the chamber 33.

A first brake means generally indicated at 60 comprises a first annularly shaped friction element or brake drum 61 mounted on and constrained for rotation with the tubular shaft 54. The outer periphery of the first brake drum 61 is surfaced for engagement with a first brake shoe 62 in a conventional manner so that when the first brake shoe 62 engages the first brake drum 61 it prevents rotation of the drum 61, tubular shaft 54 and the sun gear 53. The first brake shoe 62 is mounted on the housing 14 in chamber 33 in a conventional manner.

A second brake means generally indicated at 63 comprises a second annularly shaped friction element or brake drum 64 mounted on and constrained for rotation with the driven shaft 32. The second brake drum 64 is mounted in the chamber 33 adjacent to the first brake drum 61. The outer periphery of the second brake drum 64 is surfaced for engagement with a second brake shoe 65 in a conventional manner so that when the second brake shoe 65 engages the second brake drum 64 it prevents the rotation of the second brake drum 64 and the driven shaft 32.

A shield 66 covering the outside portion of the driven shaft 32 is provided to protect the operator from possible injury when the shaft 32 is rotating. The shield 66 is rigidly mounted on the end bell 43 by means of suitably disposed studs and nuts one of which is shown at 67 threaded for reception in threaded recessed portions of the end bell 43.

Referring now to Figures 2 and 3 the second brake shoe 65 is fitted with upper and lower complementary members 68 and 69 fixed to the shoe 65 and adapted to engage the shoe 65 with the second brake drum 64 when member 69 is moved in an upward direction toward the upward complementary member 68 in a conventional manner. Similarly the first brake shoe 62 is fitted with upper and lower complementary members 70 and 71 fixed to the shoe 62 and adapted to engage shoe 62 with the first brake drum 61 when member 71 is moved in an upward direction toward the upper complementary member 70 in a conventional manner.

Since any frictional type braking mechanism is subjected to considerable wear on the braking surfaces, take-up adjustment screws are provided for each of the brake shoes 62 and 65. For the first brake shoe 62 there is provided an adjustment screw 72 which is fitted into a threaded bore 73 in housing 14 and adapted to engage the member 70 for vertical take-up movement on the brake shoe 62. Similarly for the second brake shoe 65 there is provided an adjustment screw 74 which is fitted into a threaded bore 75 in housing 14 and adapted to engage the member 68 for vertical take-up movement on the brake shoe 65.

On the lower complementary member 69 of the second brake shoe 65 there is a downwardly depending pin 76 pivotally mounted at 77 on bifurcated bearing support 78. The bearing support 78 is integrally connected to the lower complementary member 69 of the second brake shoe 65. Similarly on the lower complementary member 71 of the first brake shoe 62 there is a downwardly depending pin 79 pivotally mounted at 80 on bifurcated bearing support 81. The bearing support 81 is integrally connected to the lower complementary member 71 of the brake shoe 62.

For controlling the engagement or disengagement of the first and second brake means 60 and 63 there is provided a manually operable control lever 82 having a detent mechanism 83 adapted to engage alternately slots 84 and 85 of the quadrant 86. The quadrant 86 is mounted rigidly on the housing 14 by bolt 87 adapted to fit into a threaded bore (not shown) in the housing 14. The lever 82 is rigidly connected to a control shaft 88 at the outer end thereof. The control shaft 88 is fitted for rotational movement in a laterally disposed bore 89 through the lower portion of the housing 14 and having its axis positioned midway between the first and second brake shoes 62 and 65. The control shaft 88 extends through the bore 89 into chamber 33 of the housing 14. On the inner end of the control shaft 88 is mounted a control member 90 having oppositely disposed arms 91 and 92 thereon. The arm 91 has a cup-shaped recessed portion 93 on the upper portion thereof positioned to receive and retain the lower end of depending pin 76. Similarly the arm 92 has a cup-shaped recessed portion 94 on the upper portion thereof positioned to receive and retain the lower end of depending pin 79. It should be noted that the recessed portions 93 and 94 are adapted to retain pins 76 and 79, respectively, in position to permit the brake shoes 65 and 62, respectively, in a disengagement relation with the brake drums 64 and 61, respectively, when the arms 91 and 92 are horizontally disposed. The pins 76 and 79 are urged downwardly to seat in the recessed portions 93 and 94 of the arms 91 and 92 by the spring action of the brake shoes 65 and 62 tending toward disengagement from the brake drums 64 and 61. The control member 90 is constrained for rotational movement with the control shaft 88 attendant to movement of the control lever 82.

Operation

As shown in Figure 3 the control lever 82 is in a "neutral" position. The arms 91 and 92 of the control member 90 are in a horizontal position. In this position both brake shoes 65 and 62 are disengaged from brake drums 64 and 61 respectively. Thus both drums 61 and 64 are rotatable.

When the control lever 82 is in the neutral position driving force from the engine of the tractor transmitted to the drive shaft 18 causes driving rotation of the planetary ring gear 24. The gear teeth 25 of the ring gear 24 engages the teeth of the pinion gears 38 causing driving rotation thereof about the respective pinion shaft 39. The pinion gears 38 being also engaged with sun gear 53 causes driving rotation of the sun gear and tubular shaft 54 and its associated first brake drum 61. Since as above stated the first brake shoe 62 is disengaged from the first brake drum 61 the force transmitted from the drive shaft 18 is dissipated in the free rotation of the first brake drum 61. In this condition, except for frictional characteristics, there is no driving connection between the ring gear 24 and the planetary carrier 37 and its associated driven shaft 32. On the other hand the driven shaft 32 is rotatable without constraint and may rotate to some extent due to frictional characteristics of the planetary system overcoming the friction in bearing 42 supporting one portion of the driven shaft 32, it being remembered that the second brake shoe 65 is disengaged from the second brake drum 64 and the driven shaft 32 associated therewith. Normally the operator of the tractor is desirous of either transmitting power from the drive shaft 18 to the driven shaft 32 or locking the driven shaft 32 from further rotation.

Now, referring to Figure 3, if the operator desires to transmit power from the drive shaft 18 to the driven shaft 32 he moves the control lever 82, from the operator's station, in a direction indicated by the arrow A until the detent mechanism 83 engages the slot 84 of the quadrant 86. This movement causes the control shaft 88 and its associated control member 90 to rotate a few degrees in a counterclockwise direction. The arms 91 92 associated with the control member 90 also move correspondingly about the axis of the control shaft 88 with the control member 90. The arm 91 recedes in a downward direction permitting the pin 76 to move downward which causes further expansion of its associated brake shoe 65 in a direction opposite to that required for engagement with brake drum 64. Thus the brake drum 64 remains rotatable with its associated driven shaft 32. The movement of arm 92 is in an upward direction driving the pin 79 upwardly in a direction to close or engage the first brake shoe 62 with the first brake drum 61. Thus the first brake drum 61 is locked from further rotation by frictional engagement with the first brake shoe 62 and referring to Figure 1 the sun gear 53 and tubular shaft 54 associated with the first brake drum 61 are also locked from further rotation. In this condition power from the drive shaft 18 and its associated ring gear 24 drives the pinion gears 38 and associated planetary carrier 37 concentrically about the now stationary sun gear 53. Since the sun gear 53 is locked against rotation the driving force of the ring gear 24 is transmitted through the pinion gears 38 to drive rotatively the planetary carrier 37 and its associated driven shaft 32 at a reduced speed from that of the drive shaft 18. The aforesaid speed reduction is effected through suitable gearing ratios of the planetary system as commonly known in the art and need not be further discussed here. Thus driving force from the drive shaft 18 is transmitted at a reduced speed to the driven shaft 32.

Now referring back to Figure 3 if the operator desires to terminate the transmission of force from the drive shaft 18 to the driven shaft 32, he grasps the control lever 82 from the operator's station and by conventional means releases the detent mechanism 83 from slot (not shown) and moves the control lever 82 in a direction indicated by the arrow B until the detent mechanism 83 engages the slot 85 of quadrant 86. This movement causes the control lever 82 to pass through the above described neutral position to a position for locking the driven shaft 32 against rotation and disengaging the transmission of driving force from the drive shaft 18 to the driven shaft 32. The movement of the control lever 82 in a direction indicated by the arrow B to the position whereby the detent mechanism 83 engages the slot 85 of the quadrant 86 causes the control shaft 88 and its associated control member 90 to rotate several degrees in a clockwise direction. The arms 91 and 92 associated with the control member 90 also move correspondingly about the axis of the control shaft 88 with the control member 90. The arm 92 recedes in a downward direction permitting the pin 79 to move downward which causes expansion of its associated first brake shoe 62 in a direction opposite to that required for engagement with the first brake drum 61. Thus the first brake shoe 62 disengages from the first brake drum 61 permitting the first brake drum 61 to rotate. Thus the driving force from drive shaft 18 is dissipated through the free rotation of the first brake drum 61 similar to that described above for neutral position of the control lever 82. In this position it can be seen that the driving force from the drive shaft 18 is no longer transmitted to the driven shaft 32. The movement of arm 91 is in an upward direction driving the pin 76 upwardly in a direction to close or engage the second brake shoe 65 with the second brake drum 64. Thus the second brake drum 64 and the driven shaft 32 associated therewith is locked from further rotation by frictional engagement with the second brake shoe 65. Thus in this position the driven shaft 32 is not only locked against rotation but also the transmission of driving force from the drive shaft 18 to the driven shaft 32 is terminated.

Having thus described a preferred embodiment of the invention with the view of concisely illustrating the same, we claim:

1. In combination with a tractor, a detachable speed-reduction power take-off mechanism comprising a compartmented housing mounted on said tractor, said housing having a brake containing chamber adjacent to a planetary gear unit containing compartment, a drive shaft journalled for rotation in said compartment, one end of said drive shaft rotatably connected to a source of power on said tractor and the other end constrained for rotation in said compartment, a driven shaft constrained for rotation in coaxial alinement with said drive shaft and extending through said chamber, one end of said driven shaft projecting outside of said housing and the other end extending into said compartment, a planetary gearing unit disposed in said compartment, said gearing unit comprising a ring gear drivingly connected for rotation with the other end of said drive shaft, a planetary carrier constrained for rotation with said driven shaft, a plurality of pinion shafts disposed equilaterally in said planetary carrier, said pinion shafts each being mounted parallel to said drive shaft, a pinion gear mounted on and constrained for rotation about each of said pinion shafts, said pinion gears each being meshed with said ring gear, a force reaction member disposed concentrically about said driven shaft and constrained for rotation about the axis of said driven shaft, said force reaction member comprising a sun gear positioned in meshing relation with said pinion gears and brakable to engage said gearing unit to cause transmission of driving force from the drive shaft to the driven shaft, said gearing unit being inoperable to transmit driving force from the drive shaft to the driven shaft when the force reaction member is unconstrained against rotation, a tubular shaft disposed concentrically about said driven shaft and constrained for rotation about the axis of said driven shaft, one end of said tubular shaft projecting into said compartment and constrained for rotation with said force reaction member and the other end of said tubular shaft extending into said chamber, a first releasably engageable brake means including a first annular friction element mounted within said chamber and constrained for rotation with the other end of said tubular shaft for preventing rotation thereof when said first brake means is engaged, a plurality of bearings mounted on said housing and positioned in axially spaced relation between said force reaction member and said first annular friction element, said bearings adapted to support rotatably said tubular shaft including said first annular friction element and said force reaction member in coaxial alinement with said driven shaft, a second releasably engageable brake means including a second annular friction element mounted within said chamber adjacent to said first friction element and constrained for rotation with said driven shaft for preventing rotation thereof when said second brake means is engaged, each of said first and second rotatable annular friction elements having an outer periphery adapted to engage a circumferentially disposed braking shoe, a first and second brake shoes disposed in said chamber adapted to engage circumferentially said annular friction elements, each of said shoes being connected to said housing, means for alternately engaging said first and second brake shoes with said annular friction elements comprising a lever pivotally mounted on said housing between said first and second brake shoes, a control member including a pair of oppositely disposed arms connected to said lever, one of said arms being adapted to engage said first brake means and the other arm being adapted to engage said second brake means, said lever when moved in one direction causes engagement of said first brake means while disengaging said second brake means thereby engaging said mechanism for transmission of power from said drive shaft to said driven shaft, and alternately when said lever is moved in the opposite direction causes engagement of said second brake means while disengaging said first brake means thereby disengaging said mechanism for transmission of power from said drive shaft to said driven shaft and preventing rotation of said driven shaft.

2. In combination with a tractor, a detachable speed-reduction power take-off mechanism comprising a compartmented housing mounted on said tractor, said housing having a brake containing chamber adjacent to a planetary gear unit containing compartment, a drive shaft journalled for rotation in said compartment, one end of said drive shaft rotatably connected to a source of power on said tractor and the other end constrained for rotation in said compartment, a driven shaft constrained for rotation in coaxial alinement with said drive shaft and extending through said chamber, one end of said driven shaft projecting outside of said housing and the other end extending into said compartment, a planetary gearing unit disposed in said compartment, said gearing unit comprising a ring gear drivingly connected for rotation with the other end of said drive shaft, a planetary carrier constrained for rotation with said driven shaft, a plurality of pinion shafts disposed equilaterally in said planetary carrier, said pinion shafts each being mounted parallel to said drive shaft, a pinion gear mounted on and constrained for rotation about each of said pinion shafts, said pinion gears each being meshed with said ring gear, a force reaction member disposed concentrically about said driven shaft and constrained for rotation about the axis of said driven shaft, said force reaction member comprising a sun gear positioned in meshing relation with said pinion gears and brakable to engage said gearing unit to cause transmission of driving force from the drive shaft to the driven shaft, said gearing unit being inoperable to transmit driving force from the drive shaft to the driven shaft when the force reaction member is unconstrained against rotation, a tubular shaft disposed concentrically about said driven shaft and constrained for rotation about the axis of said driven shaft, one end of said tubular shaft projecting into said compartment and constrained for rotation with said force reaction member and the other end of said tubular shaft extending into said chamber, a first releasably engageable brake means including a first annular friction element mounted within said chamber and constrained for rotation with the other end of said tubular shaft for preventing rotation thereof when said first brake means is engaged, a pair of anti-friction bearings mounted on said housing and positioned in axially spaced relation between said force reaction member and said first annular friction element, said bearings adapted to support rotatably said tubular shaft including said first annular friction element and said force reaction member in coaxial alinement with said driven shaft, a second releasably engageable brake means including a second annular friction element mounted within said chamber adjacent to said first friction element and constrained for rotation with said driven shaft for preventing rotation thereof when said second brake means is engaged, each of said first and second rotatable annular friction elements having an outer periphery adapted to engage a circumferentially disposed braking shoe, a first and second brake shoes disposed in said chamber adapted to engage circumferentially said annular friction elements, each of said shoes being connected to said housing, means for alternately engaging said first and second brake shoes with said annular friction elements comprising a lever pivotally mounted on said housing between said first and second brake shoes, a control member including a pair of oppositely disposed arms connected to said lever, one of said arms being adapted to engage said first brake means and the other arm being adapted to engage said second brake means, said lever when moved in one direction causes engagement of said first brake means while disengaging said second brake means thereby engaging said mechanism for transmission of power from said drive shaft to said driven shaft, and alternately when said lever is moved in the opposite direction causes engagement of said second brake means while disengaging said first brake means thereby disengaging said mechanism for transmission of power from said drive shaft to said driven shaft and preventing rotation of said driven shaft.

References Cited in the file of this patent
UNITED STATES PATENTS

| | | |
|---|---|---|
| Re. 23,857 | Banker | Aug. 10, 1954 |
| 2,330,198 | Banker | Sept. 28, 1943 |